(No Model.)  3 Sheets—Sheet 1.

J. H. ELFERING.
ANNUNCIATOR.

No. 446,641. Patented Feb. 17, 1891.

Witnesses
J. K. Shumway
Lillian D. Kelsy

John H. Elfering
By Atty. Carl W. Seymour
Inventor (No Model.) 3 Sheets—Sheet 2.
J. H. ELFERING.
ANNUNCIATOR.
No. 446,641. Patented Feb. 17, 1891.
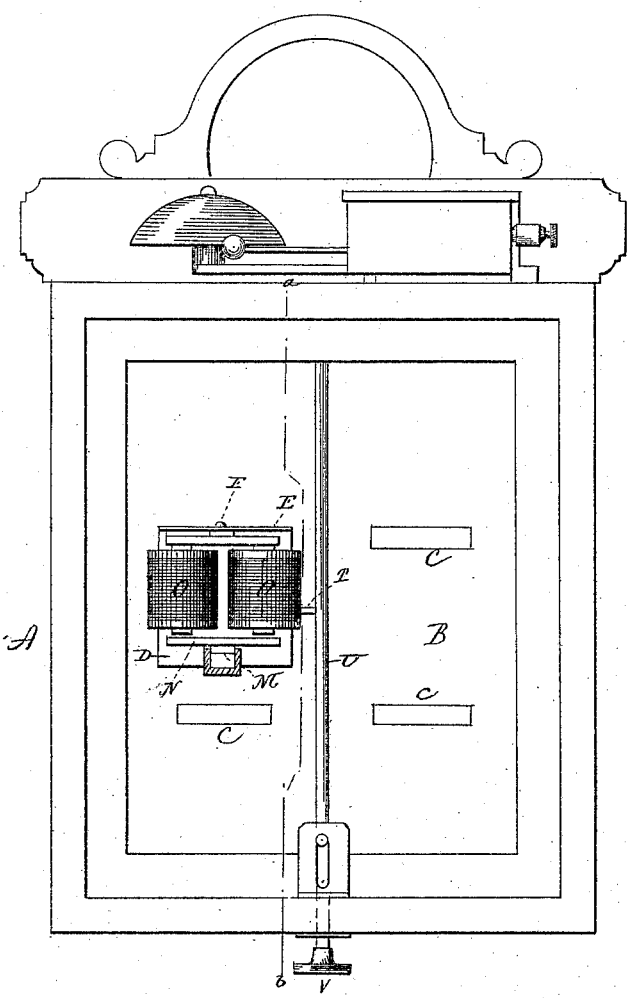

(No Model.) 3 Sheets—Sheet 3.

J. H. ELFERING.
ANNUNCIATOR.

No. 446,641. Patented Feb. 17, 1891.

Bell Boy
Ice Water
Towels
Hot Water
Chamber Maid

Push the Button
1— Bell Boy
2— Ice Water
3— Towels
4— Hot Water
5— Chamber Maid

Witnesses.
J. H. Shumway
Lillian D. Kelsey

John H. Elfering
Inventor
By Attys
Earle Seymour

THE NORRIS PETERS CO., PHOTO-LITHO., WASHINGTON, D. C.

UNITED STATES PATENT OFFICE.

JOHN H. ELFERING, OF NEW HAVEN, CONNECTICUT, ASSIGNOR OF ONE-THIRD TO S. HARRISON WAGNER, OF SAME PLACE.

ANNUNCIATOR.

SPECIFICATION forming part of Letters Patent No. 446,641, dated February 17, 1891.

Application filed April 24, 1890. Serial No. 349,276. (No model.)

*To all whom it may concern:*

Be it known that I, JOHN H. ELFERING, of New Haven, in the county of New Haven and State of Connecticut, have invented a new Improvement in Annunciators; and I do hereby declare the following, when taken in connection with accompanying drawings and the letters of reference marked thereon, to be a full, clear, and exact description of the same, and which said drawings constitute part of this specification, and represent, in—

Figure 1:
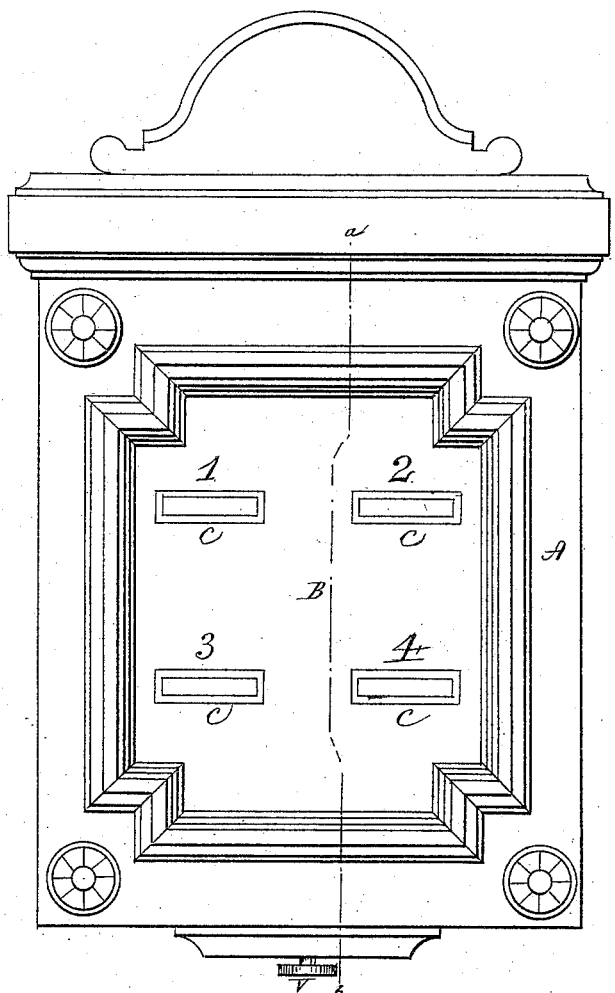
Figure 7:
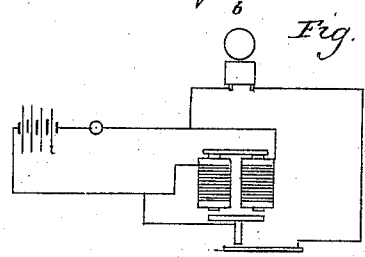
Figure 3:
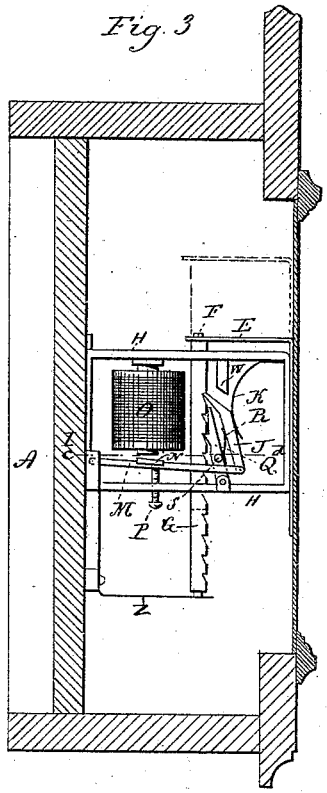
Figure 4:
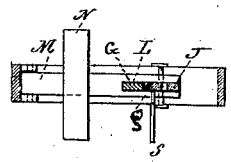
Figure 5:
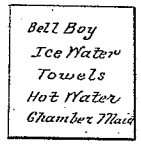
Figure 6:
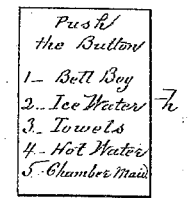

Figure 1, a view in front elevation of one form which a hotel-annunciator embodying my invention may assume. Fig. 2 is a view thereof in rear elevation. Fig. 3 is a view of the apparatus in vertical section on the line $a\,b$ of Figs. 1 and 2. Fig. 4 is a sectional view through one of the independent indicating mechanisms on the line $c\,d$ of Fig. 3. Fig. 5 is a detached view, in front elevation, of one of the want-slides. Fig. 6 is a view of a push-button and a code-card appropriate for use in connection with the apparatus shown. Fig. 7 is a diagram showing one of the circuits, all of which are alike.

My invention relates to an improvement in that class of hotel-annunciators in which the room from which a guest is calling is not only located, but also the specific want of the guest made known in the office and visually displayed there until it has been noted by the clerk, the object being to produce an apparatus of the type described which shall be very simple to construct, easy to keep in repair, absolutely non-interfering in its action, and requiring only the simple wiring of the well-known drop-annunciator, which my device may replace without any change of the wires.

With these ends in view my invention consists in a hotel-annunciator having certain details of construction and combinations of parts, as will be hereinafter described, and pointed out in the claims.

As herein shown, the case A of the instrument is provided with a face B, having four openings C, above which are respectively placed the figures 1, 2, 3, and 4, which designate rooms of corresponding numbers. It will be understood, however, that the capacity of the device is unlimited, and that it may be arranged for few or many rooms, as desired. Back of each of the openings C there is located an independent indicating mechanism, each comprising a want-carrier, here having the form of a vertically-movable slide D, displaying upon its outer face a vertical series of "wants," which will be chosen with reference to the most frequent calls of guests from their rooms. These "wants" are printed in parallel horizontal lines and at equal distances apart, so that as the slide is lifted step by step and for an equal distance each time the wants will be successively brought into alignment with and displayed through an opening in the face of the instrument. The upper end of the slide is bent backward at a right angle to form an arm E, which is secured by a screw F to the upper end of a vertically-movable rack G, having its forward edge toothed and mounted in the upper and lower members of a frame H, secured to the back I of the case A, and projecting forward therein so as to leave enough space between its forward end and the face B for the want-slide to freely play in. The construction of the frame H may, however, be varied as desired. The said rack is lifted step by step by means of a lifting or actuating pawl J, located in front of it, held in engagement with it by means of a spring K, secured to the upper member of the said frame H, and pivoted at its lower end in the outer end of a slot L, formed in the forward end of a virtually-horizontal armature-lever M, pivoted at its rear end to the frame H and carrying the armature N of an independent annunciator-magnet O, depending from the upper member of the said frame, the lower member whereof carries a screw P, by which the play of the lever, and hence of the lifting or actuating pawl, is regulated. A retaining-pawl Q, located between the said lifting-pawl and the forward edge of the rack, pivoted to the lower member of the frame H and passing through the inner end of the slot L aforesaid, is provided for holding the rack in the positions into which it is lifted by the lifting-pawl, and is thereto held in engagement with the rack by a spring R, as shown.

A horizontal tripping or unlocking pin S, carried by the said pawl g, is provided for engagement by another pin T, laterally offsetting from a vertically-movable restoring-rod U, mounted in bearings in the case A, and provided at its lower end with a button V, by which it is lifted to disengage the pawls from the rack and permit the same and the slide attached to it to drop back to their normal positions, in which the slide gives no indication through its opening in the face of the device. A beveled stop W, depending from the upper member of the frame H, is located directly over the lifting-pawl in position to be engaged thereby when the same is lifted, and so prevent the same from lifting the rack more than one step upward for one upward movement of the armature-lever; but for this stop sufficient momentum might be imparted to the rack by the armature-lever to carry the rack upward more than one step at a time and so destroy the integrity of the indications given by the slide.

Although I have described but one, it will be understood that each opening in the face of the instrument will have a want-slide and corresponding mechanism for operating the same behind it, and that all of the said mechanisms will be virtually connected together through the restoring-rod, which when lifted will restore to its normal condition any slide that may have been lifted. If the instrument is a large one, of course several restoring-rods may be employed.

Attention is called to the annunciator when any guest is calling by means of an ordinary vibrating bell X, connected in multiple with each of the magnets in the apparatus and arranged to sound only once by cutting it out of circuit after the first energization of the particular magnet being operated. This is done by making the circuit of the bell through the lower end of the rack and a spring Z, from which the rack is disengaged when it makes its first step upward.

The circuits of each mechanism will be understood by reference to the diagram forming Fig. 7 of the drawings, in which a is the battery, b a push-button in one of the rooms of the hotel, and c and d the outgoing and return wires of the main circuit. The bell X before mentioned is connected by a wire e with the main wire c and by a wire f with the spring Z, which is normally engaged with the rack G, the latter being connected through the frame H by a wire g with the main wire d.

Normally the lower end of the rack will be in engagement with the spring Z, so that the first time the circuit is closed by the push-button the current will be divided and flow through both the magnet of the bell and the annunciator-magnet in the circuit of the particular button operated, whereby the bell will be rung and the rack lifted one step and thus disengaged from the spring and the bell cut out of the circuit, not to be cut into the same again until the rack is dropped back to its normal position, which will not occur until after the call has been received and taken.

I have spoken of using push-buttons in the rooms of the hotel for making and breaking the circuits through the annunciator-magnets, and in case they are employed their right use will be set forth in a printed code-card h, containing the same list of wants as appears upon the want-carriers, together with instructions for operating the button to reproduce in the office any one of the said wants, the said instructions being made out in accordance with the number of energizations of the annunciator-magnet required to bring the respective wants into view. If, for instance, the guest wishes hot water brought, he will press the push-button in his room four times, and therefore energize the annunciator-magnet in circuit with his push-button four times, and so lift the rack, and hence the want-slide, four steps, whereby the want "hot water," which is the fourth want from the top of the list on the slide, as shown by Fig. 5 of the drawings, will be brought into alignment with the opening in the face of the annunciator. I do not, however, limit myself to the use of a push-button and code, but may use any suitable make and-break instrument in place of them. I would therefore have it understood that I do not limit myself to the exact construction herein shown and described, but hold myself at liberty to make such changes and alterations therein as fairly fall within the spirit and scope of my invention.

Having fully described my invention, what I claim as new, and desire to secure by Letters Patent, is—

1. In a hotel-annunciator, the combination, with an annunciator-magnet, of a vertically-movable want-slide, a vertically-movable rack having the slide connected with it, a lifting-pawl operated by the armature-lever of the magnet, a retaining-pawl for holding the rack in its lifted position, and a stop located above the lifting-pawl which engages with it and prevents the rack from being moved more than one step upward at a time, substantially as described.

2. In a hotel-annunciator, the combination, with an annunciator-magnet, of a vertically-movable want-slide, a vertically-movable rack having the slide connected with it, a lifting-pawl operated by the armature-lever of the magnet, a retaining-pawl located between the rack and the lifting-pawl, an unlocking-pin carried by the said retaining-pawl, and a restoring-rod adapted to engage with the said pin and throw both pawls temporarily away from the rack to permit the same to drop, substantially as described.

3. In a hotel-annunciator, the combination, with an annunciator-magnet, of a slotted armature-lever therefor, a vertically-movable want-slide, a vertically-movable rack having the slide connected with it, a lifting-pawl pivoted in the outer end of the slot in the said lever and engaged with the rack, a retaining-pawl passing through the inner end of the slot in the lever and engaging with the said rack, and means operating through the retaining-pawl for temporarily disengaging both pawls from the rack to permit the same to drop to its normal position, substantially as described.

4. In a hotel-annunciator, the combination, with an annunciator-magnet, of a want-carrier, movable operating mechanism connecting the magnet and carrier, whereby the latter is operated by the energization of the former, a shunt including a bell, and a contact-finger in circuit with the bell and engaged by the said movable operating mechanism when the same is in its normal position, whereby upon the first energization of the magnet the current divides and operates the bell which is then cut out of circuit by the movement of the said mechanism away from the said contact-finger, substantially as described.

5. In a hotel-annunciator, the combination, with an annunciator-magnet, of a want-carrier, a vertically-movable rack having the want-carrier connected with it, step-by-step mechanism operated by the magnet for lifting the rack, a bell, and a contact-finger in circuit with the bell and engaged by the rack when the same is in its normal position, whereby the bell is cut out of circuit after the first upward movement of the rack which is thus disengaged from the spring, so that the bell is sounded but once, substantially as described.

6. In a hotel-annunciator, the combination, with an annunciator-magnet, of a vertically-movable want-slide, a vertically-movable rack having the slide connected with it, a lifting-pawl operated by the armature-lever of the magnet, a retaining-pawl for holding the rack in its lifted position, a bell, and a contact-spring in circuit with the bell and engaged by the rack when the same is in its normal position, but disengaged therefrom when the rack makes its first upward movement, substantially as set forth.

JOHN H. ELFERING.

Witnesses:
   FRED C. EARLE,
   LILLIAN D. KELSEY.